US010802725B2

(12) United States Patent
Krishnamurthy et al.

(10) Patent No.: US 10,802,725 B2
(45) Date of Patent: Oct. 13, 2020

(54) MANAGEMENT OF UNMAP PROCESSING RATES IN DISTRIBUTED AND SHARED DATA STORAGE VOLUMES

(71) Applicant: VMWARE, INC., Palo Alto, CA (US)

(72) Inventors: Pradeep Krishnamurthy, Bangalore (IN); Prasanna Aithal, Bangalore (IN)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 16/412,458

(22) Filed: May 15, 2019

(65) Prior Publication Data

US 2020/0285398 A1 Sep. 10, 2020

(51) Int. Cl.
G06F 3/06 (2006.01)
(52) U.S. Cl.
CPC ............ *G06F 3/0611* (2013.01); *G06F 3/067* (2013.01); *G06F 3/0659* (2013.01)
(58) Field of Classification Search
CPC ....... G06F 3/0611; G06F 3/065; G06F 3/0683
See application file for complete search history.

(56) References Cited

U.S. PATENT DOCUMENTS

| 2004/0194095 | A1* | 9/2004 | Lumb | G06F 9/4887 718/100 |
| 2008/0104283 | A1* | 5/2008 | Shin | H04L 47/6285 710/6 |
| 2012/0066448 | A1* | 3/2012 | Colgrove | G06F 3/0619 711/114 |
| 2012/0233434 | A1* | 9/2012 | Starks | G06F 3/0626 711/170 |
| 2016/0283162 | A1* | 9/2016 | Inagaki | G06F 3/0652 |
| 2017/0102884 | A1* | 4/2017 | Kim | G06F 3/0613 |
| 2017/0315740 | A1* | 11/2017 | Corsi | G06F 3/0688 |
| 2019/0265909 | A1* | 8/2019 | Frolikov | G06F 3/0659 |

* cited by examiner

Primary Examiner — Edward J Dudek, Jr.

(57) ABSTRACT

The disclosure herein describes managing a rate of processing unmap requests for a data storage volume. Unmap requests are received from a cluster of active hosts that are associated with the data storage volume. Latency data values of each active host are then accessed. A long-term cluster latency average value is calculated based on the accessed latency data values of all active hosts over a long-term time period and a short-term cluster latency average value is calculated based on the accessed latency data values of all active hosts over a short-term time period. An unmap rate adjustment value is calculated based on a difference between the long-term cluster latency average value and the short-term cluster latency average value. The rate of processing unmap requests for the data storage volume is adjusted based on the unmap rate adjustment value and the unmap requests are performed based on the adjusted rate.

20 Claims, 5 Drawing Sheets

MANAGEMENT OF UNMAP PROCESSING RATES IN DISTRIBUTED AND SHARED DATA STORAGE VOLUMES

RELATED APPLICATIONS

Benefit is claimed under 35 U.S.C. 119(a)-(d) to Foreign Application Serial No. 201941008880 filed in India entitled "MANAGEMENT OF UNMAP PROCESSING RATES IN DISTRIBUTED AND SHARED DATA STORAGE VOLUMES", on Mar. 7, 2019, by VMware, Inc., which is herein incorporated in its entirety by reference for all purposes.

BACKGROUND

In some systems, such as virtualization systems, data storage volumes may be shared across multiple hosts. Managing shared data storage volumes includes managing how storage space is claimed or reserved by the hosts as well as how storage space is reclaimed or freed when a host no longer needs the storage space. In many such systems, the management of the reclamation of storage space includes receiving and processing unmap requests from each of the hosts. However, because many different hosts may issue many unmap requests over any particular timespan, it is challenging to configure the system to perform the unmap requests at a rate that efficiently completes the unmap requests without slowing down other operations of the system that may be higher priority than the unmap request processing. For instance, if a rate of processing unmap requests was set to 1 Gigabyte per second (GBps) for a host using a data storage volume, the system may be able to handle the unmap request processing. However, if there are 16 hosts using the data storage volume, the collective unmap rate for the data storage volume is 16 GBps, which may result in slowed unmap processing and other I/O operations associated with the data storage volume.

Further, because the number of hosts using a data storage volume may change dynamically during use, identifying a single processing rate that handles unmap processing for one host and for a plurality of hosts, as hosts are added or removed, is difficult and results in inefficiencies, especially at the extremes of the potential number of hosts. For example, unmap requests for a single host may be processed slowly and inefficiently when the processing rate used is configured for use with many hosts, while unmap requests from many hosts (e.g., 1000 hosts) may cause the system to slow down or lag when the processing rate used per host is configured for use with fewer hosts.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for managing a rate of processing unmap requests for a data storage volume is described. A plurality of unmap requests are received and buffered from a cluster, or distributed group, of active hosts that are associated with a data storage volume. Latency data values of each active host of the cluster are then accessed based on a latency access interval. A long-term cluster latency average value is calculated based on the accessed latency data values of all active hosts in the cluster over a long-term time period and a short-term cluster latency average value is calculated based on the accessed latency data values of all active hosts in the cluster over a short-term time period. The long-term time period is longer than the short-term time period. Then, an unmap rate adjustment value is calculated based on a cluster latency difference between the long-term cluster latency average value and the short-term cluster latency average value, wherein the calculated unmap rate adjustment value indicates an unmap rate increase based on the short-term cluster latency average value being less than the long-term cluster latency average value, or the calculated unmap rate adjustment value indicates an unmap rate decrease based on the short-term cluster latency average value being greater than the long-term cluster latency average value. The rate of processing unmap requests for the data storage volume is adjusted based on the calculated unmap rate adjustment value and the buffered unmap requests are performed based on the adjusted rate of processing unmap requests.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Figure 1:
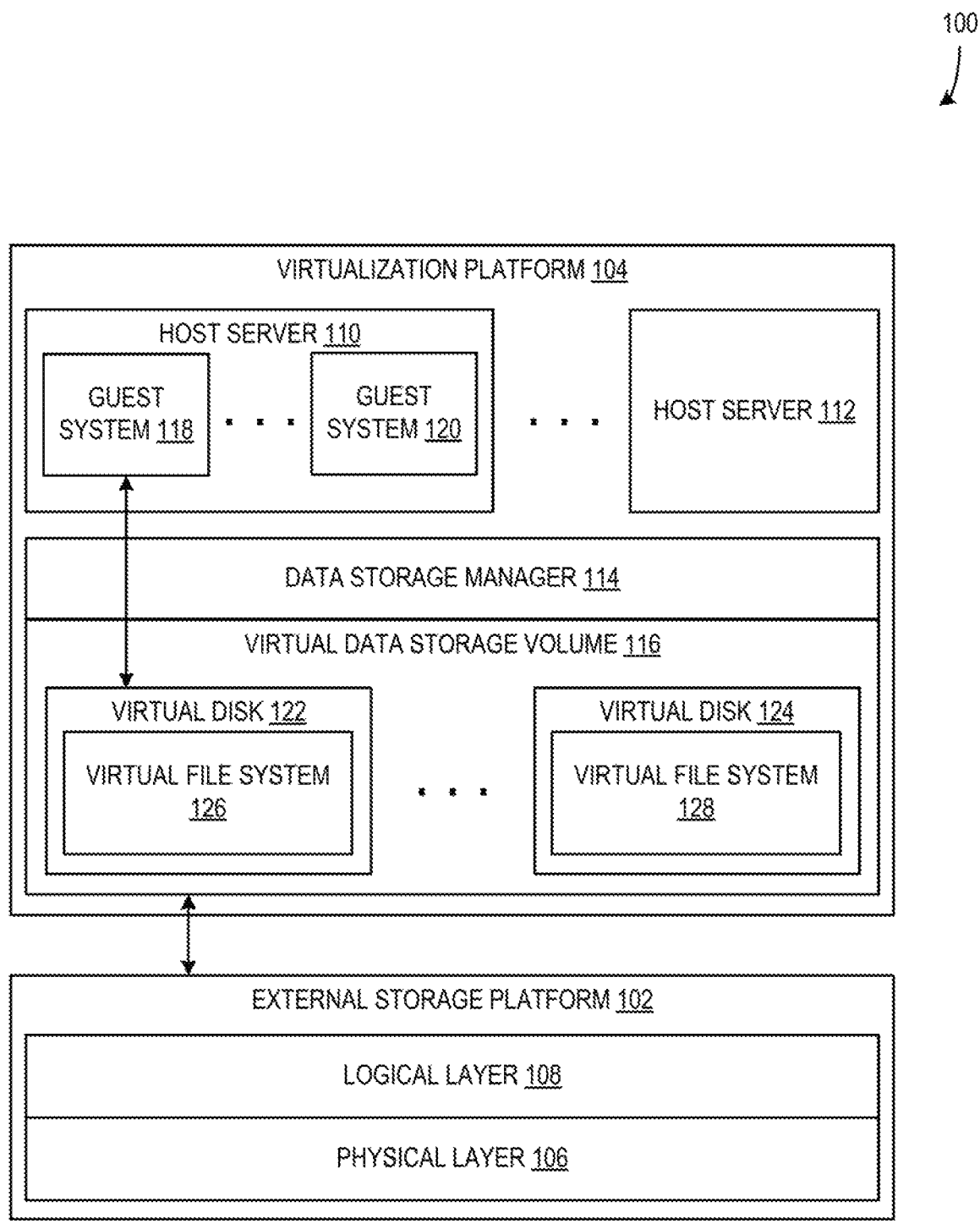
FIG. 1 is an exemplary block diagram illustrating a system configured for enabling storage of data associated with virtualized guest systems according to an example.

Aspects of the disclosure provide a computerized method and system for managing a rate of processing unmap requests for a data storage volume. A plurality of hosts are associated with the data storage volume, such as by mounting the data storage volume and issuing input/output (I/O) requests to the data storage volume. In virtualized examples, the hosts execute guest systems, such as virtual machines (VMs), and as a result of the execution of the guest systems, a plurality of unmap requests are generated (e.g., when files are deleted by the guest systems) and then received and buffered for processing. It should be understood that, in examples of the described methods and systems, buffering unmap requests for processing includes recording the unmap requests such that the unmap requests are accessible by an unmap request processing service, which performs the unmapping process associated with the buffered requests in the background and/or asynchronously from other operations being performed by the system. Aspects of the disclosure are also operable in non-virtualized environments.

Latency data values of each active host of a cluster are accessed. The latency data values are used to calculate a long-term cluster latency average value based on a long-term time period and a short-term cluster latency average value based on a short-term time period. The difference between the long-term cluster latency average value and the short-term cluster latency average value is then used to calculate an unmap rate adjustment value that indicates whether the rate of processing unmap requests is to be increased or decreased. A short-term value that is greater than the corresponding long-term value results in an adjustment value that indicates a decrease in the processing rate, while a short-term value that is less than the corresponding long-term value results in an adjustment rate that indicates an increase in the processing rate. After the unmap rate adjustment value is calculated, it is applied to the rate of processing the unmap requests. Then, the buffered unmap requests are processed or performed based on the adjusted rate. In this way, if latency data indicates that current latency levels are higher than average, the processing of unmap requests is reduced in the hopes of reducing latency of the system. Alternatively, if the latency data indicates that current latency levels are lower than average, the processing of the unmap requests is increased in an effort to make use of any available processing bandwidth.

The disclosure operates in an unconventional way at least by monitoring the latency of the cluster of active hosts generally as well as the latency of each host specifically to dynamically adjust or throttle the rate of processing unmap requests across the system. Each host may maintain an unmap rate that is specific to the host but also responsive to cluster-wide latency changes. Further, the unmap rates associated with the system and data storage volume may update automatically to account for the inclusion of new active hosts or for active hosts leaving the system or being deactivated (e.g., no longer sharing access to the data storage volume).

In virtualization systems specifically, one advantage of the disclosure is the ability for the system to respond to the addition and removal of virtual machines that share access to a particular data storage volume, which may increase and decrease the amount of unmap requests on that storage volume. The disclosure improves efficiency and performance of such virtualization systems by enhancing the performance of unmap requests associated with each hypervisor and associated virtual machines.

While some virtualized examples are described with reference to VMs for clarity of description, these examples are operable with other forms of virtual computing instances (VCIs). A VCI may be a VM, a container, and/or any other type of virtualized computing instance. Further, while some examples are described with reference to virtualization, the disclosure is operable in non-virtualized environments.

FIG. 1 is an exemplary block diagram illustrating a system 100 configured for enabling storage of data associated with virtualized guest systems (e.g., guest systems 118-120) according to an example. The system 100 includes an external storage platform 102 and a virtualization platform 104. The external storage platform 102 includes a physical layer 106 and a logical layer 108. The physical layer 106 includes one or more hard drives or other computer readable storage media and other associated hardware. The logical layer 108 includes the next layer of abstraction "above" the physical layer 106, including software, firmware, and/or hardware (e.g., logical unit(s), backing array (s)) configured to provide access to and enable interaction with the physical layer via exposed interfaces (e.g., application program interfaces (APIs)) or other similar functions. Such interfaces may be accessed by the virtualization platform 104 and associated components as described below. Further, the physical layer 106 and/or the logical layer 108 may be configured to manage the use of the memory of the physical layer 106. It should be understood that the external storage platform 102 and the layers therein may be configured according to any arrangement and operate in any manner that would be understood by a person of ordinary skill in the art without departing from the description herein.

The virtualization platform 104 includes software, firmware, and/or hardware configured to make use of the external storage platform 102 to store and manage data associated with the operations of VMs and/or other virtualized components therein. It should be understood that the virtualization platform 104 and its associated components may all be stored as data within the external storage platform 102 and that the various blocks illustrated in the system 100 represent differences in level of abstraction, function, or the like.

The virtualization platform 104 includes host servers 110-112, a data storage manager 114, and a virtual data storage volume 116. The host servers 110-112, or hosts, include software configured to perform operations of a virtualized server or hypervisor that provides a platform upon which guest systems, or VMs, (e.g., guest systems 118-120) may be executed. The hosts and any associated guest systems are configured to use the virtual data storage volume 116 as a virtual hard drive or similar data storage medium. The data storage volume 116 is accessible to the hosts 110-112 and configured to behave like a hard drive during interactions with the guest systems 118-120, while also interacting with the external storage platform 102 via the logical layer 108 when data writes and reads are performed. The data storage volume 116 may be configured to operate in any manner that would be understood by a person of ordinary skill in the art without departing from the description herein.

In particular, the data storage volume 116 may be configured to provide guest systems with virtual storage space (e.g., virtual disks 122, 124) that may be formatted by the guest system for use as a hard drive (e.g., as virtual file systems 126, 128). For instance, the guest system 118 formats the virtual disk 122 space of the virtual data storage volume 116 with a virtual file system 126 (e.g., New Technology File System (NTFS), File Allocation Table (FAT), Third Extended Filesystem (EXT3)). The guest system 118 may then perform computing operations making use of the virtual file system 126 for storing data as if it were stored directly on a physical disk. The virtual data storage volume 116 may include many virtual disks 122-124 with associated virtual file systems 126-128 that may be used by multiple guest systems 118-120 across multiple host servers 110-112.

The data storage manager 114 of the virtualization platform 104 includes software for monitoring and/or managing the complex operations of the virtual data storage volume 116 and interactions with the hosts and guest systems. For instance, the data storage manager 114 is configured to manage the unmapping of storage space associated with the virtual data storage volume 116 based on guest systems deleting data or otherwise freeing space on their associated virtual disks as described herein. Because of the multiple levels of abstraction between the physical layer 106 and the virtual disks 122-124 and the associated virtual file systems 126-128, claiming storage space for storing data and/or freeing up storage space after deletion of data is a process with multiple steps.

In some examples, when the guest system 118 writes data to the virtual disk 122, the virtualization platform 104 and/or the host server 110 interacts with the logical layer 108 of the external storage platform 102 to claim or "map" logical and/or physical storage space of the external storage platform 102 to the virtual disk 122. Alternatively, or additionally, the virtualization platform 104 may maintain an amount of mapped external storage space for the virtual disk 122, such that most data writes to the virtual disk 122 by the guest system 118 may be performed without introducing latency due to the additional time required for the mapping interaction between the virtualization platform 104 and the logical layer 108. The data storage manager 114 may be configured to map data to virtual disks of the virtual data storage volume 116 in a background process in order to maintain an effective amount of unused, mapped storage space for each virtual disk. The amount that is maintained may be defined in the settings of the associated host server, guest system, and/or virtual data storage volume.

Similarly, when the guest system 118 deletes data from the virtual disk 122, the data storage manager 114 may be configured to receive unmap requests or messages from the guest system 118 and/or host server 110. When performing or otherwise processing a received unmap request, the data storage manager 114 and/or virtualization platform 104 generally may communicate with the logical layer 108 to unmap the external storage space associated with the data being deleted. Once unmapped, that external storage space is freed for use in another virtual disk or by another system, application, or component. In some examples, the data storage manager 114 is configured to process unmap requests from host servers 110-112 and/or guest systems 118-120 at a dynamic rate based on the latency and/or other performance measures of the host servers 110-112. This dynamic processing is described in greater detail below with respect to FIGS. 2-4.

Figure 2:
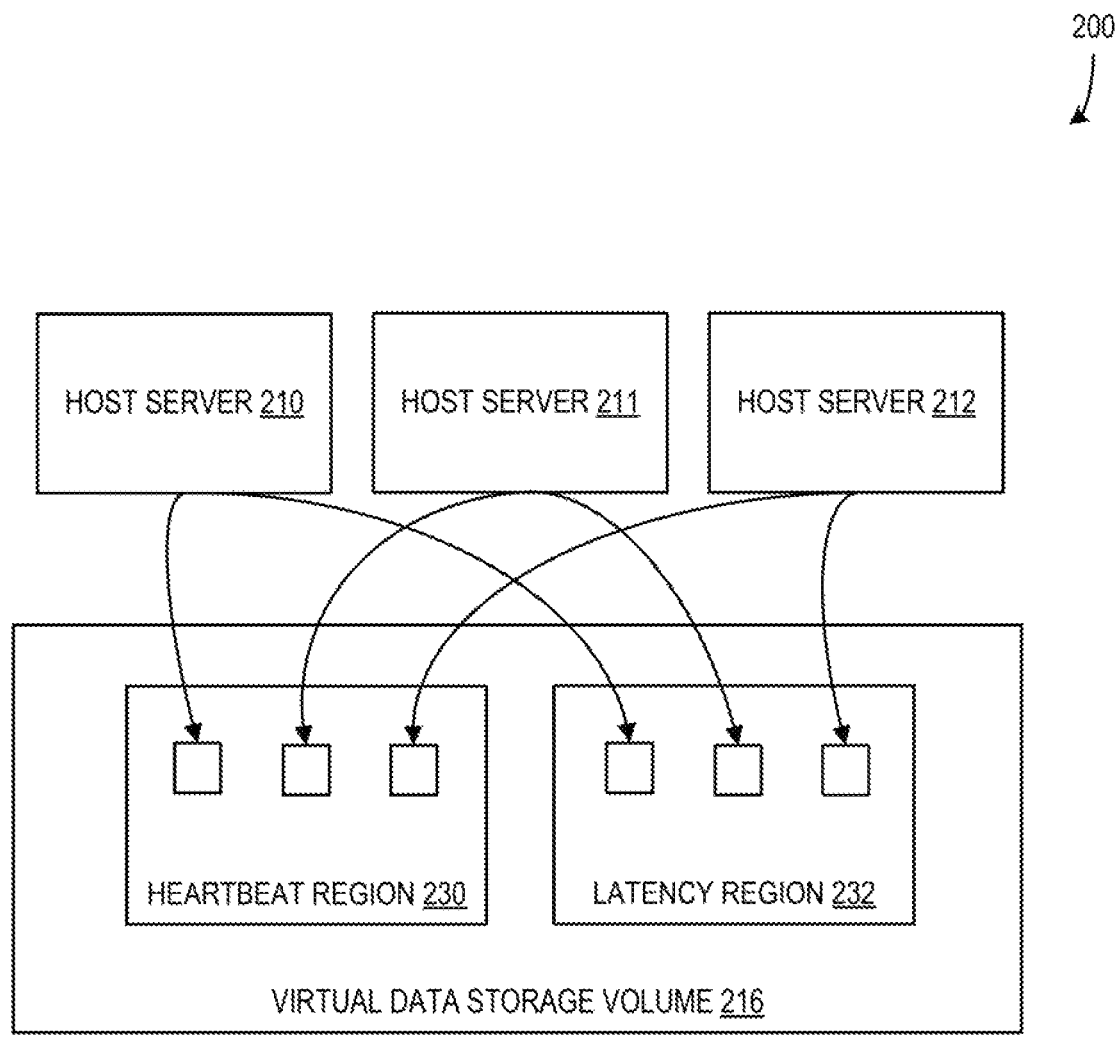
FIG. 2 is an exemplary block diagram illustrating a system configured to enable host servers to provide status information at the logical layer according to an example.

FIG. 2 is an exemplary block diagram illustrating a system 200 configured to enable host servers 210-212 to provide status information at the virtual data storage volume 216 according to an example. It should be understood that the host servers 210-212 and virtual data storage volume 216 may be part of a system such as system 100 of FIG. 1 described above. The virtual data storage volume 216 includes a heartbeat region 230 and a latency region 232. The heartbeat region 230 is a space of the virtual data storage volume 216 that active host servers regularly update to verify that they are actively making use of the associated storage. Each active host may have an assigned address to which timestamp information is periodically written (e.g., once every 4 seconds). Other components of the greater system 200 may read the heartbeat region 230 to identify how many host servers are currently active as well as determine identifiers of the active hosts (e.g., the heartbeat region may include active host identifier information for each assigned address). In some examples, the active host information of the heartbeat region 230 is used by a data storage manager component (e.g., data storage manager 114) when determining a rate at which to process unmap requests, as described below with respect to FIG. 3.

The latency region 232, like the heartbeat region 230, is a space in the memory of the virtual data storage volume 216 that is assigned to store latency data associated with each active host server. The host servers 210-212 may periodically update an assigned storage space of the latency region 232 with current latency data (e.g., the length of time taken to perform certain operations, such as input/output (I/O) operations). The latency data may be raw data from the host server itself and/or any guest systems that may be associated with the host server. Alternatively, or additionally, the latency data may include processed data of the operations of the host server, such as average latency across all associated guest systems over a defined interval. As with the heartbeat data described above, a data storage manager component (e.g., data storage manager 114) may access and use the latency data of the latency region 232 when determining a rate at which to process unmap requests, as described below with respect to FIG. 3.

In some examples, the host servers 210-212 are configured to periodically update the latency region 232 based on a latency update interval or rate (e.g., an interval or rate at which the host servers provide new latency data to the latency region 232). For instance, each host server 210-212 updates the latency region 232 with up-to-date latency information every 15 seconds. Further, the latency region 232 may be configured to store a plurality of sets of the most recent latency information (e.g., the latency region 232 may store the last 50 latency information sets, or latency information of the host servers for the past 50 minutes). Alternatively, or in addition, one of the host servers, or another component of the system, may poll the active host servers to obtain the data to store in the heartbeat region 230 and/or latency region 232.

Figure 3:
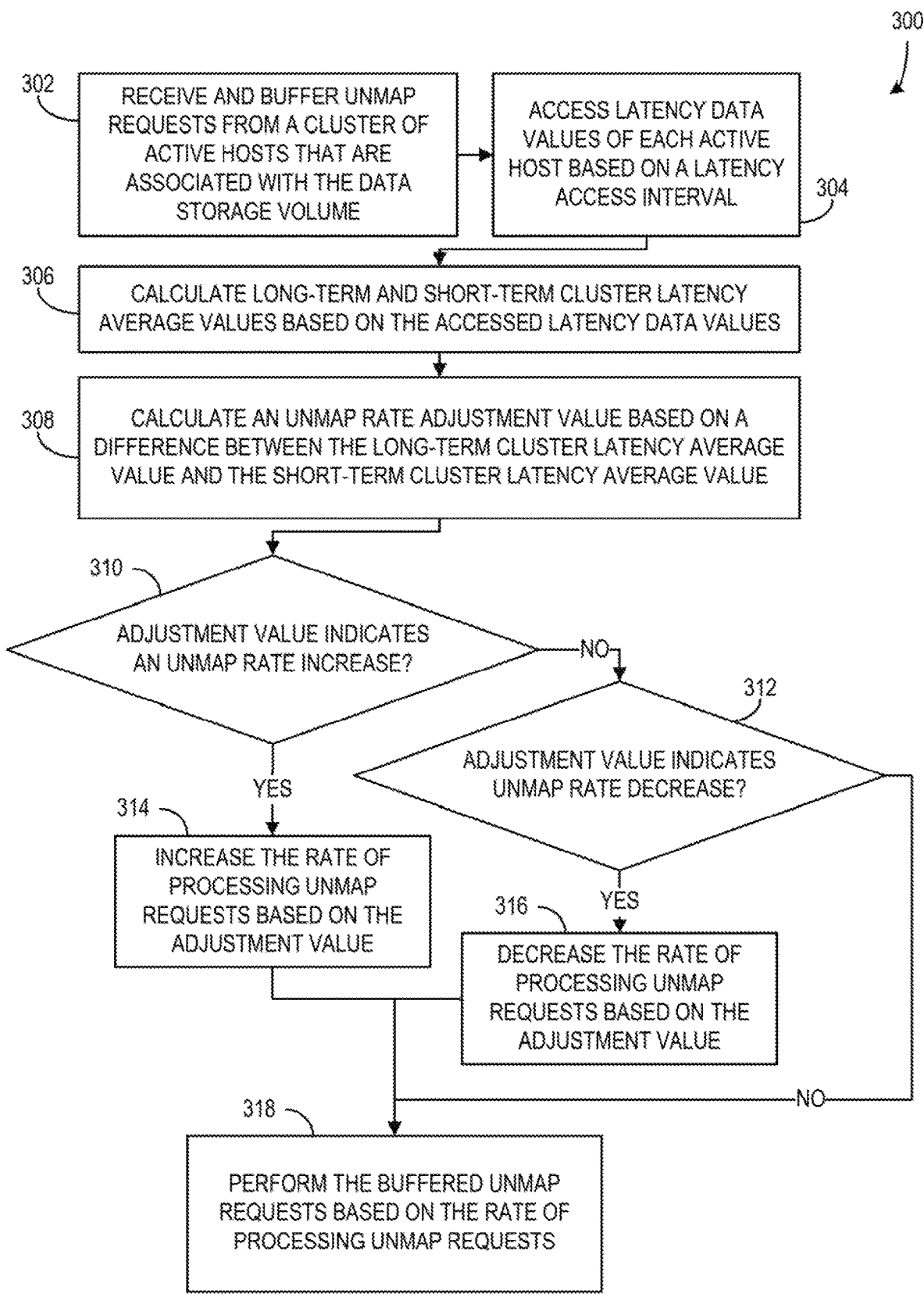
FIG. 3 is an exemplary flow chart illustrating a method of managing a rate of processing unmap requests for a data storage volume according to an example.

FIG. 3 is an exemplary flow chart illustrating a method 300 of managing a rate of processing unmap requests for a data storage volume (e.g., virtual data storage volume 116) according to an example. In some examples, the method 300 is performed by a system that is configured as described above (e.g., system 100 of FIG. 1), including components such as a data storage manager and/or a data storage volume that provides storage for a cluster of active hosts. At 302, a data storage manager or similar component may receive and buffer unmap requests from a cluster of active hosts that are associated with the data storage volume. In some examples, each active host receives and buffers the unmap requests from its hosted guest systems and the unmap rate management is performed by a data storage manager component that is part of or otherwise associated with each active host (e.g., each active host includes a separate data storage management component).

Receiving an unmap request may include a guest system or virtual machine (e.g., guest systems 118-120) performing a delete operation within an associated virtual file system (e.g., virtual file systems 126-128) and the virtual file system sending an associated unmap request to the virtual disk (e.g., virtual disks 122-124) upon which the virtual file system is installed. The sent unmap request may be received at the host server and/or an associated data storage manager and buffered to be performed as described herein. Buffering the unmap requests from a cluster of hosts may be done in buffers specific to each host server and/or in a buffer that is associated with the shared data storage volume.

At 304, latency data values of each active host are accessed based on a latency access interval. As described above, in some examples, each host records current latency data in a latency data storage region (e.g., latency region 232). Accessing the latency data values may include the data storage manager of the data storage volume and/or data storage managers specific to each active host accessing the latency data storage region and thereby accessing the latency data values for all of the active hosts in the cluster. Accessing the latency data values may include reading and/or caching the data values from the latency data storage region for use throughout the rest of the method 300. The latency access interval may be a defined time interval (e.g., 1 minute, 2 minutes, 30 seconds) that is associated with the data volume and/or specifically associated with the active hosts (e.g., some active hosts may have different latency access intervals than other active hosts).

In some examples, the latency data values that are accessed are associated with specific operations of the cluster and the associated hosts. For instance, the latency data values accessed are latency measurements that are specific to input/output (I/O) communications of the hosts and/or specific to a particular type of I/O operations or communications of the hosts. The type of latency data used may be based on the priority of the associated operations and/or the degree to which processing unmap requests may affect the latency of such operations (e.g., latency data for high priority I/O operations of the hosts that are substantially affected by processing unmap requests may be used, while other types of latency data, including latency data specific to the processing of unmap requests, may be ignored).

At 306, long-term and short-term cluster latency average values are calculated based on the accessed latency data values. The long-term cluster latency average value, or the slow simple moving average of cluster latency, may be calculated based on the latency data values that are accessed over a defined long-term time period and the short-term cluster latency average value, or the fast exponential moving average of cluster latency, may be calculated based on the latency data values that are accessed over a defined short-term time period. It should be understood that the long-term time period (e.g., a first time period) is defined to be longer than the short-term time period (e.g., a second time period). The long-term and short-term time periods may be defined based on exact time intervals (e.g., a long-term time period of 1 hour and a short-term time period of 10 minutes) and/or based on quantity of latency data values used in the calculation (e.g., a long-term time period that includes the 50 most recently recorded latency data values and a short-term time period that includes the 15 most recently recorded latency data values). The average values may be calculated by adding or otherwise combining the accessed data values together and dividing the result by the number of data values.

At 308, an unmap rate adjustment value is calculated based on the difference between the long-term cluster latency average value and the short-term cluster latency average value. It should be understood that the resulting unmap rate adjustment value may indicate an increase in the unmap rate (e.g., the rate at which unmap requests are processed with respect to the cluster of active hosts and/or specific hosts) at 310 or a decrease in the unmap rate at 312.

Calculation of the adjustment rate may be configured such that changes in latency of the cluster of hosts indicated by the difference between the long-term and short-term cluster latency average values are counteracted by the calculated unmap adjustment rate. For instance, if the short-term cluster latency average value is substantially higher than the long-term cluster latency average value, it indicates that the latency of the cluster is increasing or has increased, and the unmap rate adjustment value may be calculated to indicate a decrease in the unmap rate (e.g., decreasing the unmap rate may reduce the processing and/or communication load on the system generally which may result in reducing the latency back toward the long-term cluster latency average value). In an alternative example, the short-term cluster latency average value may be lower than the long-term cluster latency average value, indicating that the latency of the cluster is decreasing or has decreased. This may indicate that the system has available bandwidth to process unmap requests and the unmap rate adjustment value may be calculated to increase the unmap rate.

In some examples, the unmap rate adjustment value is calculated as a percentage increase or decrease based on the difference of the latency average values (LAVs). For instance, a percentage change is calculated as shown below.

Unmap rate adjustment value=(Short-term cluster LAV−Long-term cluster LAV)/Long-term cluster LAV In the above equation, the adjustment value may be a percentage difference between the short-term cluster latency average value and the long-term cluster latency average value (e.g., a short-term cluster latency average value of 125 and a long-term cluster latency average value of 100 results in a 0.25 or 25% difference).

If the adjustment value indicates an unmap rate increase at 310, the rate of processing unmap requests is increased based on the adjustment value at 314. Alternatively, if the adjustment value indicates an unmap rate decrease at 312, the rate of processing unmap requests is decreased based on the adjustment value at 316. In some examples, an unmap rate adjustment value that is a percentage value as described above is multiplied by the current unmap rate to determine a new adjusted unmap rate. An exemplary equation is shown below.

Adjusted unmap rate=Current unmap rate−(Current unmap rate*Unmap rate adjustment value)

In the above equation, the unmap rate is adjusted by subtracting a portion of the current unmap rate that is based on the unmap rate adjustment value. Increasing latency based on the latency average values described above results in the unmap rate being decreased due to the subtraction. Alternatively, decreasing latency based on the latency average values introduces a negative unmap rate adjustment value to the equation, resulting in the unmap rate being increased (e.g., an unmap rate adjustment value of 0.25 from the above example and a current unmap rate of 1000 MBps results in an adjusted unmap rate of 750 MBps).

At 318, the buffered unmap requests are performed based on the rate of processing unmap requests, or the unmap rate. That unmap rate may be the adjusted unmap rate from 314 or 316. Alternatively, in some examples, the adjustment value does not indicate an unmap rate increase or decrease, in which case, the current unmap rate is used to performed the buffered unmap requests at 318. For instance, the system is configured to ignore differences between the short-term and long-term latency average values that do not exceed a defined threshold (e.g., rate adjustment values that are less than a 5% increase or decrease may be ignored). It should be understood that performance and/or processing of the buffered unmap requests may occur in the background or otherwise asynchronously from other operations of the system.

Calculating the unmap rate adjustment value or otherwise adjusting the rate at which unmap requests are processed may be based on additional or alternative factors. In some examples, the calculation of the adjustment value may be based on current and/or average rates of change of the cluster latency values, rather than just the latency average values. For instance, determining that the latency of the cluster of active hosts has increased by 100 milliseconds over the past 30 seconds based on analysis of the latency data values from the past 30 seconds, the unmap rate adjustment value is calculated to decrease rate of processing unmap requests to slow or reverse the latency increase. Similarly, determining that the latency of the cluster of active hosts has decreased by a similar amount over the same time period may result in an unmap rate adjustment value calculated to increase the rate of processing unmap requests. Such "latency rate of change" calculations may be done on latency data values over time periods similar to the long-term time period and short-term time period described above. Further, the latency average values and latency rate of change values may be combined in calculating the unmap rate adjustment value (e.g., if a short-term cluster latency average value is higher than the associated long-term average value but the rate of change data indicates that the latency is decreasing, an unmap rate adjustment may not be done; Alternatively, if the short-term cluster latency average value is higher than the associated long-term average value and the rate of change data indicates that the latency is increasing, the associated unmap rate may be aggressively adjusted to slow or reverse the increasing latency).

The degree to which the short-term cluster latency average value differs from the associated long-term cluster latency average value may also be considered when calculating an adjustment value. In some examples, a percentage difference threshold may be defined (e.g., a 20% difference, a 30% difference, a 50% difference) such that, when the short-term cluster latency average value differs from the long-term cluster latency average value, whether the short-term value is greater than or less than the long-term value, a calculated unmap rate adjustment value is multiplied by a defined rate adjustment factor or weight (e.g., 1.5, 2) to increase or accelerate the effect of the adjustment on the rate of processing unmap requests. Alternatively, the percentage difference threshold and/or an associated multiplicative factor may be different for a short-term cluster latency average value that is greater than the associated long-term value than for a short-term cluster latency average value that is less than the associated long-term value. For instance, a short-term latency average value that has increased more than 20% over the associated long-term average value merits an aggressive increase in the effect of the unmap rate adjustment (e.g., the adjustment value may be multiplied by 2 when a greater than 20% difference is detected). Alternatively, response to a lower short-term cluster latency average value may be less urgent, such that no rate adjustment factor or weight is applied to such an adjustment value unless the short-term cluster latency average value is 40% less than the long-term cluster latency average value. Further, the rate adjustment factor applied at a short-term value that is 40% less than the long-term value may be less (e.g., 1.25, 1.5).

Alternatively, rather than percentage difference, the latency data values may be statistically analyzed to identify a standard deviation of the latency of the cluster over time and use the identified standard deviation as a threshold as described above, such that a rate adjustment factor may be applied to an adjustment value when the short-term cluster latency average value differs from the long-term cluster latency average value by more than one standard deviation, two standard deviations, or the like.

Further, in some examples, the system includes defined maximum and/or minimum rates at which unmap requests are processed. In such examples, if the adjustment value would cause the unmap rate to exceed the maximum rate threshold or fall beneath the minimum rate threshold, adjusting the unmap rate includes setting the unmap rate at the fixed threshold level that it otherwise would cross (e.g., the unmap rate is adjusted to equal the maximum rate threshold if the adjustment value would otherwise cause the unmap rate to exceed the maximum rate threshold). Such maximum and minimum rates may also be used when the latency average values of the cluster exceed extreme high or low latency thresholds. For example, the maximum unmap rate are used when the latency average values of the cluster remain below the extreme low latency threshold (e.g., 10 ms or below), or the minimum unmap rate are used when the latency average values of the cluster remain above the extreme high latency threshold (e.g., 100 ms or above).

Maximum rates of processing unmap requests may be based on a defined maximum unmap rate, or total unmap capacity, of the system (e.g., the data storage volume and/or the external storage platform) divided by the number of active hosts. For instance, if the total unmap capacity of the system is 20 GBps and there are four active hosts, each active host may be assigned a fraction of the total unmap capacity, or a capacity bucket, of 5 GBps. In this example, the maximum rate of processing unmap requests for each active host may be set to 5 GBps. Unmap rate adjustment values may be applied to such "capacity bucket" values for active hosts as described herein.

Additionally, or alternatively, adjustments to the rate of processing unmap requests may be based on known cluster latency and/or use patterns. For instance, latency patterns may indicate that, during the weekend or at night, the cluster and associated hosts have relatively low processing loads, resulting in lower average latency. During those times, adjustments to the unmap rate of the cluster and/or hosts may tend to increase the unmap rate since it is more likely to have available processing bandwidth. Such a tendency may be implemented through the use dynamic rate adjustment factors or weights that are applied based on such known latency patterns. Alternatively, or additionally, patterns that are very regular (e.g., very low processing loads on weekends) may result in unmap rates being set to either maximum or minimum rates (e.g., unmap rates may be sent to the highest rate on weekends).

It should be understood that, while the description primarily describes use of this method with a virtualization system, other types of systems may make use of the systems, components, or methods described herein.

Figure 4:
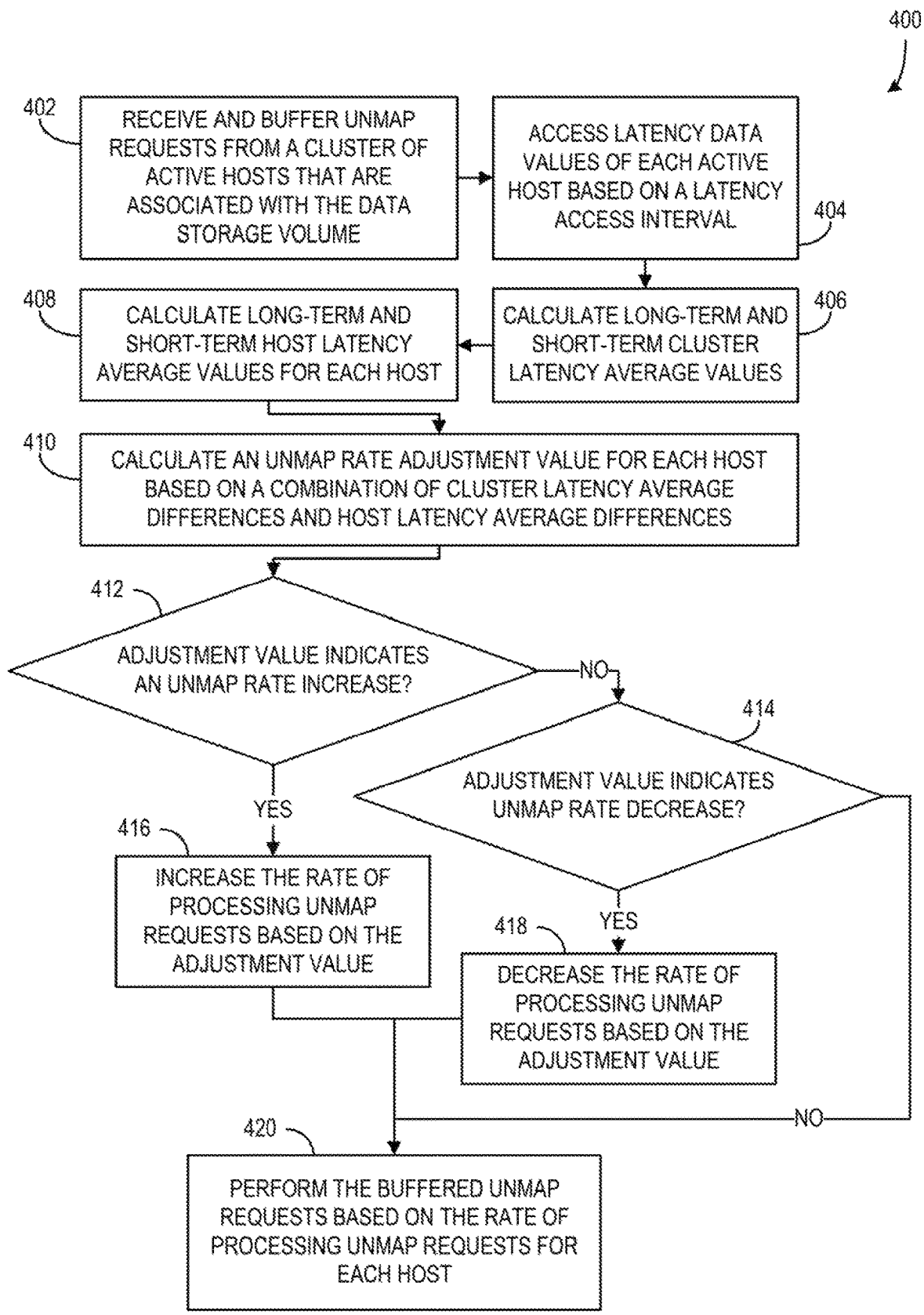
FIG. 4 is an exemplary flow chart illustrating a method of managing a host-specific rate of processing unmap requests for a data storage volume according to an example.

FIG. 4 is an exemplary flow chart illustrating a method 400 of managing a host-specific rate of processing unmap requests for a data storage volume according to an example. It should be understood that the method 400 may be implemented and/or performed by components of a system such as system 100 of FIG. 1 described above. At 402-406, unmap requests are received and buffered, latency data values of each active host are accessed, and long-term and short-term cluster latency average values are calculated in substantially the same manner as described above with respect to 302-306 of FIG. 3.

At 408, long-term and short-term host-specific latency average values, or host latency average values, are calculated for each active host in the cluster. The host latency average values are calculated in much the same manner as the cluster latency average values described above, except the latency data values used in the calculation are limited to those latency data values associated with the specific host for which the latency average values are being calculated. The calculation of the host specific latency average values may be performed by a component associated with the data storage volume (e.g., the data storage manager 114). Alternatively, each host may be configured to calculate the associated latency average values and provide them to other components of the system as necessary to perform the operations described herein. Further, in some examples, each host manages the rate at which unmap requests are processed and the hosts make use of the calculated host latency average values to do so.

In some examples, the long-term and short-term host latency average values are calculated based on the same long-term time period and short-term time period described above, respectively. Alternatively, the time periods used for the host latency average values may be different than those used for the cluster-wide latency average values. For instance, the long-term and short-term time periods used for a host are shorter than the cluster-wide time periods when a single host has more rapidly changing latency average values than the broader cluster-wide values. Alternatively, the long-term and short-term time periods used for a host are longer than the cluster-wide time periods to ensure that the latency average value calculation is using a sufficiently large pool of data values.

At 410, an unmap rate adjustment value is calculated for each host based on a combination of the cluster latency average value differences and the host latency average value differences. The cluster latency average values may be used in substantially the same manner as described above in 308 of FIG. 3. However, the host-specific latency average values are combined with and included in the unmap rate adjustment value. The combination of the values may include summing a first rate adjustment value based on the cluster latency average values calculated as described above with a second rate adjustment value calculated based on the host-specific latency average values. The result may then be normalized (e.g., divided by 2) so that the resulting rate adjustment value represents an averaged percentage difference between short-term and long-term latency average values.

In some examples, the calculation of the unmap rate adjustment value further includes applying priority factors or weight values to the cluster-based rate adjustment and/or the host-based rate adjustment when combining them into the final rate adjustment value. Through the use of one or more priority factors, either the cluster-based data or the host-based data may be more heavily weighted relative to the other data set (e.g., more heavily weighting the cluster-based rate adjustment results in an unmap rate adjustment value that more closely reflects the cluster-wide latency situation rather than the host-specific latency situation). An example calculation is shown below.

> Unmap rate adjustment value=(Cluster Priority Factor)*((Short-term cluster LAV−Long-term cluster LAV)/Long-term cluster LAV)+(Host Priority Factor)*((Short-term host LAV−Long-term host LAV)/Long-term host LAV)

The above equation may also include normalization, as mentioned above, to ensure that the resulting unmap rate adjustment value may be used to accurately adjust the rate of processing unmap requests. For instance, defining the cluster priority factor and host priority factor to be fractions that add up to 1 (e.g., a cluster priority factor of 0.65 and a host priority factor of 0.35), the resulting unmap rate adjustment value should reflect a weighted percentage difference between short-term and long-term latency average values.

For each host, if the adjustment value indicates an unmap rate increase at 412, the rate of processing unmap requests of that host is increased based on the adjustment value at 416. Alternatively, if the adjustment value indicates an unmap rate decrease at 414, the rate of processing unmap requests of that host is decreased based on the adjustment value at 418. It should be understood that these adjustments are made in substantially the same manner as described above with respect to 310-316 of FIG. 3. However, rather than a single unmap rate being adjusted and used for the entire cluster, the adjusted unmap rates are specific to the hosts for which they the adjustment rates have been calculated, enabling specific hosts that have lower latency than the cluster average to increase the rate of processing unmap requests by a larger amount to more efficiently take advantage of available processing bandwidth, while specific hosts that have higher latency than the cluster average may more significantly decrease the rate of processing unmap requests to more quickly reduce latency at the specific host.

At 420, the buffered unmap requests of each active host of the cluster are performed or otherwise processed based on the rate of processing unmap requests for each host. It should be understood that the buffered unmap requests may be performed in substantially the same manner as described above with respect to 318 of FIG. 3.

Additional Example Scenarios

Aspects of the disclosure enable various additional scenarios, such as next described.

In an example, a virtualization system includes a virtualization platform communicating with an external storage platform. The virtualization platform includes a virtual data storage volume and three host servers. Each host server of the virtualization platform executes a dynamic number of guest systems as the virtualization system operates. A data storage manager component of the virtualization platform manages unmap requests received from the host servers and associated guest systems and processes the requests to unmap storage space of the virtual data storage volume and the associated physical storage space of the external storage platform as described herein.

At a point during operation of the virtualization system, each of the 3 host servers has an associated unmap rate of 300 MBps that is provided by the data storage manager, for a total cluster unmap rate of 900 MBps. The system is configured with a maximum cluster unmap rate of 1500 MBps, or 500 MBps per host server, and a minimum cluster unmap rate of 300 MBps, or 100 MBps per host server. Further, each of the 3 host servers provide current latency data value to the data storage manager, which uses the latency data values to calculate unmap rate adjustment values for each of the three host servers as described herein.

In a further example, a long-term cluster latency average value is calculated at 50 ms and a short-term cluster latency average value is calculated at 55 ms. Each of the host servers has substantially the same latency levels for the purposes of the example. The data storage manager calculates an unmap rate adjustment value of 0.1, or a 10% change between the short-term and long-term latency average values. The data storage manager then applies the unmap rate adjustment value to the unmap rates of each of the three host servers, reducing those rates by 10% in order to slow or reverse the increased latency levels. After the adjustment, each of the three host servers have unmap rates of 270 MBps (10% less than the original 300 MBps rates). The cluster unmap rate for all three host servers is now 810 MBps.

Later, the cluster latency levels increase suddenly and substantially, such that the short-term cluster latency average value is calculated at 85 ms, while the long-term cluster latency average value remains 50 ms. The resulting unmap rate adjustment value is 70%. The 70% adjustment value is applied to the unmap rates of each of the three host servers, such that the current unmap rates of 270 MBps are to be reduced to 81 MBps. However, the data storage manager determines that such an adjustment would fall below the minimum unmap rate of 100 MBps, so instead, the unmap rates of the three host servers are each set to the minimum rate of 100 MBps.

In another example, all three host servers are operating with consistent 50 ms latency levels with unmap rates of 400 MBps (with a cluster unmap rate of 1200 MBps). While the first and second host servers of the three host servers continue to operate at those latency levels, the latency of the third host server drops down to 20 ms over the short-term time period. The data storage manager calculates a host specific unmap rate adjustment value for the third host server, weighing the relatively consistent cluster-wide latency and the rapidly changing host-specific latency evenly. As a result, the host-specific unmap rate adjustment value is found to be 30% (a host-specific latency change of 60% and a cluster-wide latency change of ~0%). The adjusted unmap rate of the third host would be 520 MBps (400 MBps*130%), but that rate would exceed the maximum host unmap rate of 500 MBps. Instead, the data storage manager sets the unmap rate of the third host server to the maximum rate of 500 MBps.

Exemplary Operating Environment

In examples that involve a hardware abstraction layer on top of a host computer (e.g., server), the hardware abstraction layer allows multiple containers to share the hardware resource. These containers, isolated from each other, have at least a user application running therein. The hardware abstraction layer thus provides benefits of resource isolation and allocation among the containers. In some examples, VMs are used alternatively or in addition to the containers, and hypervisors are used for the hardware abstraction layer. In these examples, each VM generally includes a guest operating system in which at least one application runs.

For the container examples, it should be noted that the disclosure applies to any form of container, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Figure 5:
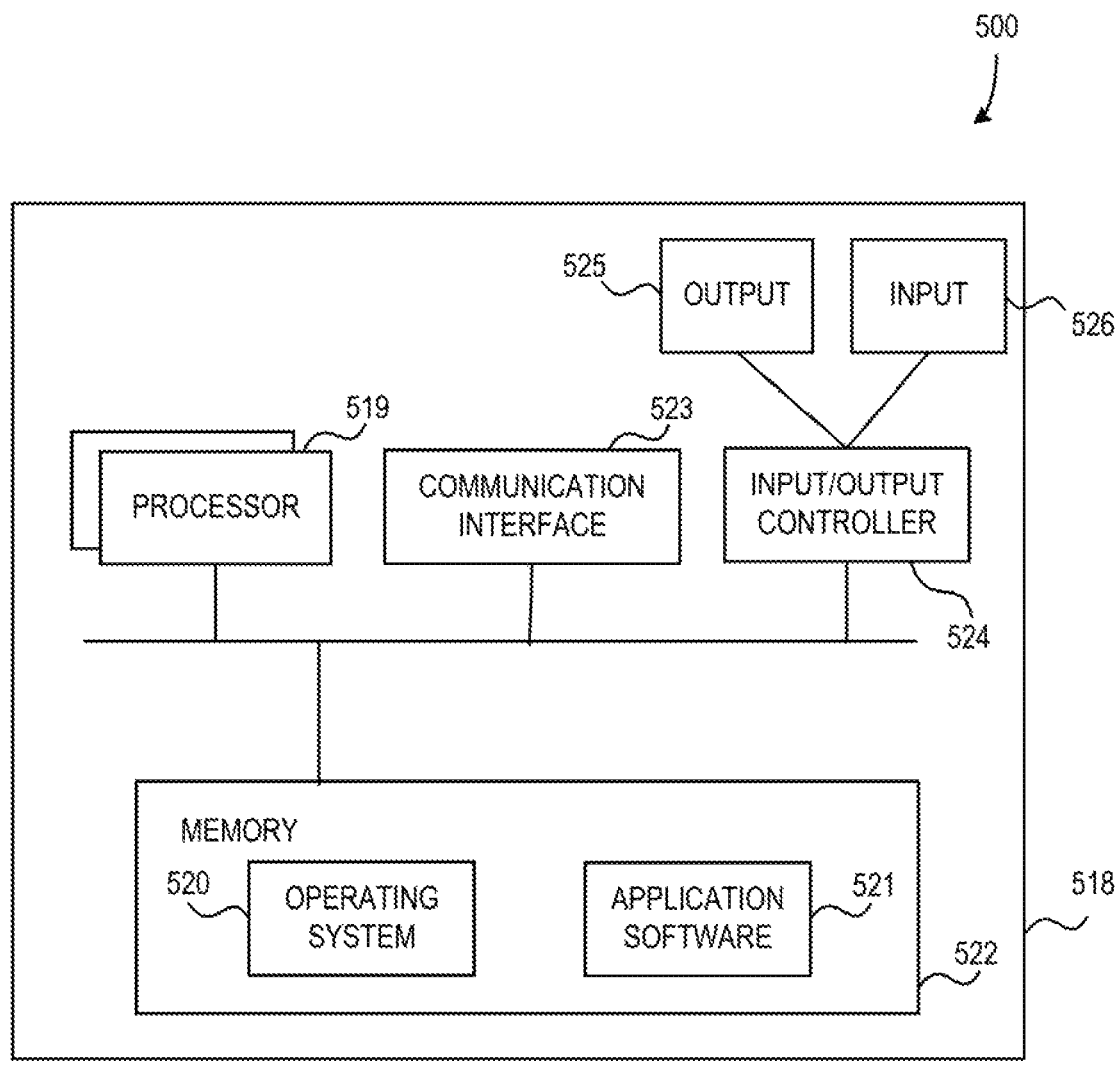
FIG. 5 illustrates a computing apparatus according to an example as a functional block diagram.

The present disclosure is operable with a computing apparatus according to an example as a functional block diagram 500 in FIG. 5. In an example, components of a computing apparatus 518 are implemented as a part of an electronic device according to one or more examples described in this specification. The computing apparatus 518 comprises one or more processors 519 which may be microprocessors, controllers or any other suitable type of processors for processing computer executable instructions to control the operation of the electronic device. Alternatively, or in addition, the processor 519 is any technology capable of executing logic or instructions, such as a hard-coded machine. Platform software comprising an operating system 520 or any other suitable platform software may be provided on the apparatus 518 to enable application software 521 to be executed on the device. According to an example, managing a rate of processing unmap requests for a data storage volume as described herein is accomplished by software, hardware, and/or firmware.

Computer executable instructions may be provided using any computer-readable media that are accessible by the computing apparatus 518. Computer-readable media may include, for example, computer storage media such as a memory 522 and communications media. Computer storage media or non-transitory computer readable storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one example, the output device 525 also acts as the input device. An example of such a device is a touch sensitive display. The input/output controller 524 may also output data to devices other than the output device, e.g. a locally connected printing device. In some examples, a user provides input to the input device(s) 526 and/or receive output from the output device(s) 525.

The functionality described herein can be performed, at least in part, by one or more hardware logic components. According to an example, the computing apparatus 518 is configured by the program code when executed by the processor 519 to execute the examples of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computerized method for managing a rate of processing unmap requests for a data storage volume comprises: receiving and buffering, by a processor, a plurality of unmap requests from a cluster of active hosts that are associated with the data storage volume; accessing, by the processor, latency data values of each active host of the cluster based on a latency access interval; calculating, by the processor, a long-term cluster latency average value based on the accessed latency data values of all active hosts in the cluster over a long-term time period; calculating, by the processor, a short-term cluster latency average value based on the accessed latency data values of all active hosts in the cluster over a short-term time period, wherein the long-term time period is longer than the short-term time period; calculating, by the processor, an unmap rate adjustment value based on a cluster latency difference between the long-term cluster latency average value and the short-term cluster latency average value, wherein the calculated unmap rate adjustment value indicates an unmap rate increase based on the short-term cluster latency average value being less than the long-term cluster latency average value, or the calculated unmap rate adjustment value indicates an unmap rate decrease based on the short-term cluster latency average value being greater than the long-term cluster latency average value; adjusting, by the processor, the rate of processing unmap requests for the data storage volume based on the calculated unmap rate adjustment value; and performing, by the processor, the buffered unmap requests based on the adjusted rate of processing unmap requests of the data storage volume.

An example computer system comprises: a processor at a device associated with a data storage volume; a non-transitory computer readable medium having stored thereon program code for managing a rate of processing unmap requests for the data storage volume, the program code causing the processor to: receive and buffer a plurality of unmap requests from a cluster of active hosts that are associated with the data storage volume; access latency data values of each active host of the cluster based on a latency access interval; calculate a long-term cluster latency average value based on the accessed latency data values of all active hosts in the cluster over a long-term time period; calculate a short-term cluster latency average value based on the accessed latency data values of all active hosts in the cluster over a short-term time period, wherein the long-term time period is longer than the short-term time period; calculate an unmap rate adjustment value based on a cluster latency difference between the long-term cluster latency average value and the short-term cluster latency average value, wherein the calculated unmap rate adjustment value indicates an unmap rate increase based on the short-term cluster latency average value being less than the long-term cluster latency average value, or the calculated unmap rate adjustment value indicates an unmap rate decrease based on the short-term cluster latency average value being greater than the long-term cluster latency average value; adjust the rate of processing unmap requests for the data storage volume based on the calculated unmap rate adjustment value; and perform the buffered unmap requests based on the adjusted rate of processing unmap requests of the data storage volume.

An exemplary non-transitory computer readable storage medium having stored thereon program code executable by a computer system associated with a data storage volume, the program code embodying a method that comprises: receiving and buffering, by a processor, a plurality of unmap requests from a cluster of active hosts that are associated with the data storage volume; accessing, by the processor, latency data values of each active host of the cluster based on a latency access interval; calculating, by the processor, a long-term cluster latency average value based on the accessed latency data values of all active hosts in the cluster over a long-term time period; calculating, by the processor, a short-term cluster latency average value based on the accessed latency data values of all active hosts in the cluster over a short-term time period, wherein the long-term time period is longer than the short-term time period; calculating, by the processor, an unmap rate adjustment value based on a cluster latency difference between the long-term cluster latency average value and the short-term cluster latency average value, wherein the calculated unmap rate adjustment value indicates an unmap rate increase based on the short-term cluster latency average value being less than the long-term cluster latency average value, or the calculated unmap rate adjustment value indicates an unmap rate decrease based on the short-term cluster latency average value being greater than the long-term cluster latency average value; adjusting, by the processor, the rate of processing unmap requests for the data storage volume based on the calculated unmap rate adjustment value; and performing, by the processor, the buffered unmap requests based on the adjusted rate of processing unmap requests of the data storage volume.

Alternatively, or in addition to the other examples described herein, examples include any combination of the following:

- further comprising: calculating, for each active host of the cluster, a long-term host latency average value based on the accessed latency data values of the active host over the long-term time period; and calculating, for each active host of the cluster, a short-term host latency average value based on the accessed latency data values for the active host over the short-term time period; wherein calculating the unmap rate adjustment value includes calculating a host-specific unmap rate adjustment value for each active host of the cluster based on combining the cluster latency difference and a host latency difference between the long-term host latency average value of the active host and the short-term host latency average value of the active host; and wherein adjusting the rate of processing unmap requests includes adjusting, for each active host of the cluster, a host-specific rate of processing unmap requests based on the calculated host-specific unmap rate adjustment value for the active host, such that buffered unmap requests associated with the active host are performed based on the adjusted host-specific rate of processing unmap requests.
- wherein combining the cluster latency difference and the host latency difference includes applying a weight value to the cluster latency difference or the host latency difference or both.
- wherein adjusting the rate of processing unmap requests for the data storage volume includes: setting the rate of processing unmap requests to a maximum threshold rate based on the adjusted rate of processing unmap requests being greater than the maximum threshold rate; and setting the rate of processing unmap requests to a minimum threshold rate based on the adjusted rate of processing unmap requests being less than the minimum threshold rate.
- further comprising: identifying active hosts of the cluster of active hosts based on scanning a heartbeat region of the data storage volume for heartbeat indicators associated with the active hosts.
- wherein calculating the unmap rate adjustment value further includes applying a rate adjustment factor to the unmap rate adjustment value based on the cluster latency difference surpassing a latency difference threshold, wherein the rate adjustment factor increases the unmap rate adjustment value.
- wherein the long-term cluster latency average value and the short-term cluster latency average value are calculated based on accessed I/O latency data values of the cluster of active hosts.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The examples illustrated and described herein as well as examples not specifically described herein but within the scope of aspects of the claims constitute exemplary means for receiving and buffering, by a processor, a plurality of unmap requests from a cluster of active hosts associated with a data storage volume; exemplary means for accessing, by the processor, latency data values of each active host of the cluster based on a latency access interval; exemplary means for calculating, by the processor, a long-term cluster latency average value based on the accessed latency data values of all active hosts in the cluster over a long-term time period; exemplary means for calculating, by the processor, a short-term cluster latency average value based on the accessed latency data values of all active hosts in the cluster over a short-term time period, wherein the long-term time period is longer than the short-term time period; exemplary means for calculating, by the processor, an unmap rate adjustment value based on a cluster latency difference between the long-term cluster latency average value and the short-term cluster latency average value, wherein the calculated unmap rate adjustment value indicates an unmap rate increase based on the short-term cluster latency average value being less than the long-term cluster latency average value, or the calculated unmap rate adjustment value indicates an unmap rate decrease based on the short-term cluster latency average value being greater than the long-term cluster latency average value; exemplary means for adjusting, by the processor, the rate of processing unmap requests for the data storage volume based on the calculated unmap rate adjustment value; and, exemplary means for performing, by the processor, the buffered unmap requests based on the adjusted rate of processing unmap requests of the data storage volume.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method for managing a rate of processing unmap requests for a data storage volume, the method comprising:
   receiving and buffering, by a processor, unmap requests from a cluster of active hosts that are associated with the data storage volume;
   accessing, by the processor, latency data values of each active host of the cluster based on a latency access interval;
   calculating, by the processor, a long-term cluster latency average value based on the accessed latency data values of all active hosts in the cluster over a long-term time period;
   calculating, by the processor, a short-term cluster latency average value based on the accessed latency data values of all active hosts in the cluster over a short-term time period, wherein the long-term time period is longer than the short-term time period;
   calculating, by the processor, an unmap rate adjustment value based on a cluster latency difference between the long-term cluster latency average value and the short-term cluster latency average value, wherein the calculated unmap rate adjustment value indicates an unmap rate increase based on the short-term cluster latency average value being less than the long-term cluster latency average value, or the calculated unmap rate adjustment value indicates an unmap rate decrease based on the short-term cluster latency average value being greater than the long-term cluster latency average value;
   adjusting, by the processor, the rate of processing unmap requests for the data storage volume based on the calculated unmap rate adjustment value; and
   performing, by the processor, the buffered unmap requests based on the adjusted rate of processing unmap requests of the data storage volume.

2. The computerized method of claim 1, further comprising:
   calculating, for each active host of the cluster, a long-term host latency average value based on the accessed latency data values of the active host over the long-term time period; and
   calculating, for each active host of the cluster, a short-term host latency average value based on the accessed latency data values for the active host over the short-term time period;
   wherein calculating the unmap rate adjustment value includes calculating a host-specific unmap rate adjustment value for each active host of the cluster based on combining the cluster latency difference and a host latency difference between the long-term host latency average value of the active host and the short-term host latency average value of the active host; and
   wherein adjusting the rate of processing unmap requests includes adjusting, for each active host of the cluster, a host-specific rate of processing unmap requests based on the calculated host-specific unmap rate adjustment value for the active host, such that buffered unmap requests associated with the active host are performed based on the adjusted host-specific rate of processing unmap requests.

3. The computerized method of claim 2, wherein combining the cluster latency difference and the host latency difference includes applying a weight value to the cluster latency difference or the host latency difference or both.

4. The computerized method of claim 1, wherein adjusting the rate of processing unmap requests for the data storage volume includes:
   setting the rate of processing unmap requests to a maximum threshold rate based on the adjusted rate of processing unmap requests being greater than the maximum threshold rate; and
   setting the rate of processing unmap requests to a minimum threshold rate based on the adjusted rate of processing unmap requests being less than the minimum threshold rate.

5. The computerized method of claim 1, further comprising:
   identifying active hosts of the cluster of active hosts based on scanning a heartbeat region of the data storage volume for heartbeat indicators associated with the active hosts.

6. The computerized method of claim 1, wherein calculating the unmap rate adjustment value further includes applying a rate adjustment factor to the unmap rate adjustment value based on the cluster latency difference exceeding a latency difference threshold, wherein the rate adjustment factor increases the unmap rate adjustment value.

7. The computerized method of claim 1, wherein the long-term cluster latency average value and the short-term cluster latency average value are calculated based on accessed I/O latency data values of the cluster of active hosts.

8. A computer system comprising:
   a processor at a device associated with a data storage volume;
   a non-transitory computer readable medium having stored thereon program code for managing a rate of processing unmap requests for the data storage volume, the program code causing the processor to:

receive and buffer unmap requests from a cluster of active hosts that are associated with the data storage volume;

access latency data values of each active host of the cluster based on a latency access interval;

calculate a long-term cluster latency average value based on the accessed latency data values of all active hosts in the cluster over a long-term time period;

calculate a short-term cluster latency average value based on the accessed latency data values of all active hosts in the cluster over a short-term time period, wherein the long-term time period is longer than the short-term time period;

calculate an unmap rate adjustment value based on a cluster latency difference between the long-term cluster latency average value and the short-term cluster latency average value, wherein the calculated unmap rate adjustment value indicates an unmap rate increase based on the short-term cluster latency average value being less than the long-term cluster latency average value, or the calculated unmap rate adjustment value indicates an unmap rate decrease based on the short-term cluster latency average value being greater than the long-term cluster latency average value;

adjust the rate of processing unmap requests for the data storage volume based on the calculated unmap rate adjustment value; and perform the buffered unmap requests based on the adjusted rate of processing unmap requests of the data storage volume.

9. The system of claim 8, the program code further causing processor to:

calculate, for each active host of the cluster, a long-term host latency average value based on the accessed latency data values of the active host over the long-term time period; and calculate, for each active host of the cluster, a short-term host latency average value based on the accessed latency data values for the active host over the short-term time period;

wherein calculating the unmap rate adjustment value includes calculating a host-specific unmap rate adjustment value for each active host of the cluster based on combining the cluster latency difference and a host latency difference between the long-term host latency average value of the active host and the short-term host latency average value of the active host; and wherein adjusting the rate of processing unmap requests includes adjusting, for each active host of the cluster, a host-specific rate of processing unmap requests based on the calculated host-specific unmap rate adjustment value for the active host, such that buffered unmap requests associated with the active host are performed based on the adjusted host-specific rate of processing unmap requests.

10. The system of claim 9, wherein combining the cluster latency difference and the host latency difference includes applying a weight value to the cluster latency difference or the host latency difference or both.

11. The system of claim 8, wherein adjusting the rate of processing unmap requests for the data storage volume includes:

setting the rate of processing unmap requests to a maximum threshold rate based on the adjusted rate of processing unmap requests being greater than the maximum threshold rate; and setting the rate of processing unmap requests to a minimum threshold rate based on the adjusted rate of processing unmap requests being less than the minimum threshold rate.

12. The system of claim 8, the program code further causing the processor to:

identify active hosts of the cluster of active hosts based on scanning a heartbeat region of the data storage volume for heartbeat indicators associated with the active hosts.

13. The system of claim 8, wherein calculating the unmap rate adjustment value further includes applying a rate adjustment factor to the unmap rate adjustment value based on the cluster latency difference surpassing a latency difference threshold, wherein the rate adjustment factor increases the unmap rate adjustment value.

14. The system of claim 8, wherein the long-term cluster latency average value and the short-term cluster latency average value are calculated based on accessed I/O latency data values of the cluster of active hosts.

15. A non-transitory computer readable storage medium having stored thereon program code executable by a computer system associated with a data storage volume, the program code embodying a method comprising:

receiving and buffering, by a processor, unmap requests from a cluster of active hosts that are associated with the data storage volume;

accessing, by the processor, latency data values of each active host of the cluster based on a latency access interval;

calculating, by the processor, a long-term cluster latency average value based on the accessed latency data values of all active hosts in the cluster over a long-term time period;

calculating, by the processor, a short-term cluster latency average value based on the accessed latency data values of all active hosts in the cluster over a short-term time period, wherein the long-term time period is longer than the short-term time period;

calculating, by the processor, an unmap rate adjustment value based on a cluster latency difference between the long-term cluster latency average value and the short-term cluster latency average value, wherein the calculated unmap rate adjustment value indicates an unmap rate increase based on the short-term cluster latency average value being less than the long-term cluster latency average value, or the calculated unmap rate adjustment value indicates an unmap rate decrease based on the short-term cluster latency average value being greater than the long-term cluster latency average value;

adjusting, by the processor, a rate of processing unmap requests for the data storage volume based on the calculated unmap rate adjustment value; and performing, by the processor, the buffered unmap requests based on the adjusted rate of processing unmap requests of the data storage volume.

16. The non-transitory computer readable storage medium of claim 15, the program code further embodying a method comprising:

calculating, for each active host of the cluster, a long-term host latency average value based on the accessed latency data values of the active host over the long-term time period; and calculating, for each active host of the cluster, a short-term host latency average value based on the accessed latency data values for the active host over the short-term time period;

wherein calculating the unmap rate adjustment value includes calculating a host-specific unmap rate adjustment value for each active host of the cluster based on combining the cluster latency difference and a host latency difference between the long-term host latency average value of the active host and the short-term host latency average value of the active host; and wherein adjusting the rate of processing unmap requests includes adjusting, for each active host of the cluster, a host-specific rate of processing unmap requests based on the calculated host-specific unmap rate adjustment value for the active host, such that buffered unmap requests associated with the active host are performed based on the adjusted host-specific rate of processing unmap requests.

17. The non-transitory computer readable storage medium of claim 16, wherein combining the cluster latency difference and the host latency difference includes applying a weight value to the cluster latency difference or the host latency difference or both.

18. The non-transitory computer readable storage medium of claim 15, wherein adjusting the rate of processing unmap requests for the data storage volume includes:

setting the rate of processing unmap requests to a maximum threshold rate based on the adjusted rate of processing unmap requests being greater than the maximum threshold rate; and setting the rate of processing unmap requests to a minimum threshold rate based on the adjusted rate of processing unmap requests being less than the minimum threshold rate.

19. The non-transitory computer readable storage medium of claim 15, the program code further embodying a method comprising:

identifying active hosts of the cluster of active hosts based on scanning a heartbeat region of the data storage volume for heartbeat indicators associated with the active hosts.

20. The non-transitory computer readable storage medium of claim 15, wherein calculating the unmap rate adjustment value further includes applying a rate adjustment factor to the unmap rate adjustment value based on the cluster latency difference surpassing a latency difference threshold, wherein the rate adjustment factor increases the unmap rate adjustment value.

* * * * *